(12) United States Patent
Abe et al.

(10) Patent No.: US 10,120,107 B2
(45) Date of Patent: Nov. 6, 2018

(54) OPTICAL ELEMENT AND METHOD FOR PRODUCING OPTICAL ELEMENT

(71) Applicant: CANON KABUSHIKI KAISHA, Tokyo (JP)

(72) Inventors: Keiko Abe, Kawasaki (JP); Tomonari Nakayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 14/947,910

(22) Filed: Nov. 20, 2015

(65) Prior Publication Data

US 2016/0154145 A1 Jun. 2, 2016

(30) Foreign Application Priority Data

Nov. 27, 2014 (JP) .................. 2014-240621

(51) Int. Cl.
| | |
|---|---|
| *G02B 1/14* | (2015.01) |
| *G02B 27/00* | (2006.01) |
| *G02B 1/11* | (2015.01) |
| *G02B 1/113* | (2015.01) |
| *G02B 1/118* | (2015.01) |

(52) U.S. Cl.
CPC .................. *G02B 1/14* (2015.01); *G02B 1/11* (2013.01); *G02B 27/0018* (2013.01); *G02B 1/113* (2013.01); *G02B 1/118* (2013.01)

(58) Field of Classification Search
CPC ........ G02B 1/14; G02B 27/0018; G02B 1/11; G02B 1/113; G02B 1/118
See application file for complete search history.

(56) References Cited

U.S. PATENT DOCUMENTS

| | | | | |
|---|---|---|---|---|
| 2008/0085985 A1* | 4/2008 | Nakamura | .............. | C08L 63/00 |
| | | | | 528/25 |
| 2011/0176216 A1* | 7/2011 | Kawauchi | ........ | B29D 11/00903 |
| | | | | 359/614 |
| 2012/0040190 A1* | 2/2012 | You | ........................ | G02B 1/043 |
| | | | | 428/413 |
| 2012/0050871 A1* | 3/2012 | Sakai | ..................... | G02B 1/105 |
| | | | | 359/601 |
| 2013/0016430 A1* | 1/2013 | Ogawa | .................. | G02B 1/105 |
| | | | | 359/614 |

FOREIGN PATENT DOCUMENTS

| | | |
|---|---|---|
| CN | 102385075 A | 3/2012 |
| CN | 102879839 A | 1/2013 |
| CN | 103797418 A | 5/2014 |
| EP | 2725423 A1 | 4/2014 |
| JP | 2009-147189 A | 7/2009 |
| JP | 2010-54827 A | 3/2010 |
| JP | 2011145627 A | 7/2011 |
| JP | 2012-159753 A | 8/2012 |
| JP | 2013024922 A | 2/2013 |

\* cited by examiner

*Primary Examiner* — Nathan L Van Sell

(74) *Attorney, Agent, or Firm* — Canon U.S.A. Inc., IP Division

(57) ABSTRACT

An optical element having a substrate and a light-shielding film on part of an outer portion of the substrate further contains a coating on the light-shielding film, the coating containing a cured mixture of a melamine or benzoguanamine resin, and a phenolic resin, in proportions by mass of 1:5 to 7:5.

10 Claims, 2 Drawing Sheets

OPTICAL ELEMENT AND METHOD FOR PRODUCING OPTICAL ELEMENT

BACKGROUND OF THE INVENTION

Field of the Invention

The present invention relates to an optical element such as a lens and a method for producing an optical element.

Description of the Related Art

Optical elements such as optical lenses have a nontransparent film (a light-shielding film) on their outer portion to prevent flares and ghosts. Optical elements such as optical lenses also have an antireflection film to reduce surface reflection and remove scattered light resulting from reflection.

Japanese Patent Laid-Open Nos. 2011-145627 and 2013-24922 disclose optical elements. These optical elements, an example being an optical lens, have a light-shielding film on their outer portion, a protective coating on the light-shielding film, and an antireflection film.

Japanese Patent Laid-Open No. 2010-54827 discloses a protective coating. This protective coating contains at least one of the following resins: epoxy, acrylic, imide, melamine, phenolic, novolac, alkyd, maleic acid, and silicone resins. According to the disclosure, this protective coating prevents dyes in a light-shielding film, such as a black dye, from dissolving out of the film.

The inventors found the optical elements disclosed in these publications to be disadvantageous in that when they are used for a long period of time under high-temperature and high-humidity conditions, the light-shielding film changes its shade of color and develops white spots. This disadvantage can be significant particularly if the optical element is washed with an alkaline aqueous solution after the attachment of the light-shielding film and the protective coating.

The present invention provides an optical element that maintains good appearance even through a long period of use under high-temperature and high-humidity conditions despite washing with an alkaline aqueous solution prior to the formation of an antireflection film.

SUMMARY OF THE INVENTION

An aspect of the invention provides an optical element. The optical element has a substrate and a light-shielding film on part of an outer portion of the substrate. There is a coating on the light-shielding film. The coating contains a cured mixture of melamine or benzoguanamine resin, and a phenolic resin, in proportions by mass of 1:5 to 7:5.

Another aspect of the invention provides a method for producing an optical element. The method includes forming a light-shielding film on an outer portion of a substrate, forming a coating on the surface of the light-shielding film, the coating containing a cured mixture of methylol melamine or methylol benzoguanamine resin, and a phenolic resin, in proportions of 1:5 to 7:5, and forming an antireflection film on the substrate after the formation of the coating.

Further features of the present invention will become apparent from the following description of exemplary embodiments with reference to the attached drawings.

DESCRIPTION OF THE EMBODIMENTS

The following describes some embodiments of the invention.

Optical Element

An optical element according to an embodiment of the invention can be applied to a structural element of optical equipment, such as a lens, a prism, a reflector, and a diffraction grating, preferably a lens or a prism.

Figure 1:
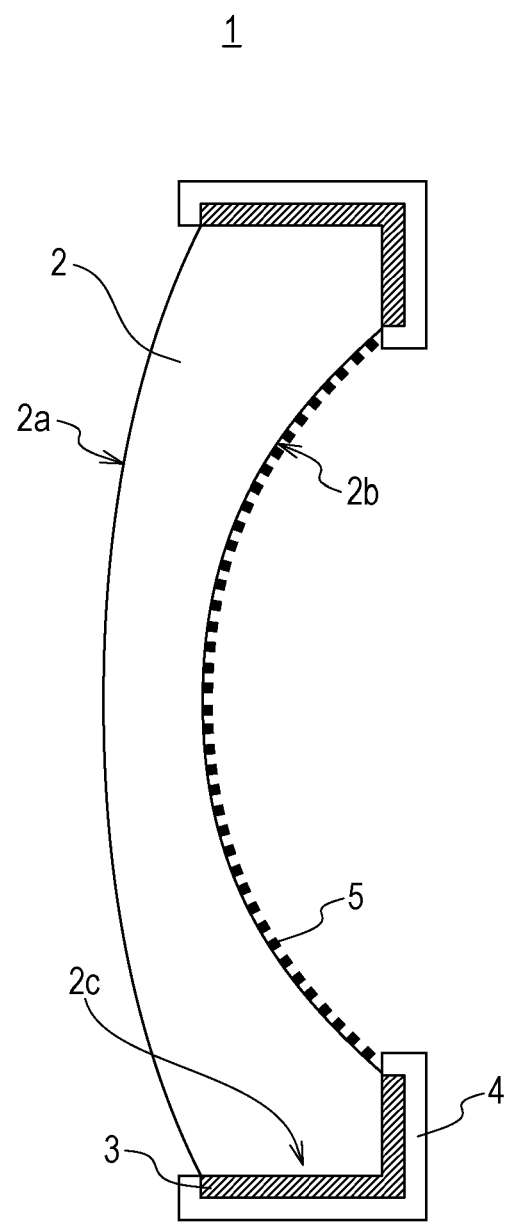
FIG. 1 illustrates an example of an optical element according to an embodiment of the invention.

The following describes an optical element according to an embodiment of the invention applied to a lens with reference to FIG. 1. As illustrated in FIG. 1, the optical element 1 has a substrate 2 that has optically effective sections 2a and 2b and an optically ineffective section 2c. There is a light-shielding film 3 on the optically ineffective section 2c of the substrate 2, with a coating 4 on the light-shielding film 3. The light-shielding film 3 extends on part or all of the optically ineffective section 2c of the optical element 1. The coating 4 may completely cover the light-shielding film 3. The light-shielding film 3 is, in general terms, a film an optical element has on its outer portion to prevent flares and ghosts.

The optical element 1 according to this embodiment has an antireflection film 5 on part of the optically effective sections 2a and 2b.

Substrate

The substrate 2 of the optical element according to this embodiment can be a material such as a piece of glass, a glass mirror, an optical lens, and a prism, preferably an optical lens or a prism. Specific examples of glass include alkali-free glass and alumina-silicate glass. Optical elements according to certain embodiments of the invention can be used in optical equipment such as cameras, binoculars, microscopes, and semiconductor exposure devices.

The substrate 2 used in this embodiment can be in any shape that can be eventually processed into the shape suitable for the intended purpose of use, and can therefore have a two- or three-dimensionally curved surface. Its thickness is not critical and is usually 5 mm or less, although not limited to this.

Light-Shielding Film

The light-shielding film 3 of the optical element according to this embodiment contains at least a coloring agent and a binder resin. The light-shielding film 3 may optionally contain other materials, such as inorganic fine particles.

The binder resin can be epoxy resin. The epoxy resin content of the light-shielding film 3 can be 5.0% by mass or more and 60.0% by mass or less, preferably 5.0% by mass or more and 40.0% by mass or less. An epoxy resin content of less than 5.0% by mass leads to low solvent resistance. An epoxy resin content of more than 60.0% by mass leads to significant internal reflection.

The coloring agent in the light-shielding film 3 can be a dye, a pigment, or a mixture of them. The dye can be any material that absorbs visible light in the wavelength range of 400 nm to 700 nm and is soluble in any solvent. A single dye or a mixture of multiple dyes, such as black, red, yellow, and blue ones, can be used. The pigment can be any material that absorbs visible light in the wavelength range of 400 nm to 700 nm. Examples of pigments that can be used include carbon black, titanium black, and iron oxides. The number-average particle diameter of the pigment can be 5 nm or more and 200 nm or less. The use of a pigment with a number-average particle diameter of less than 5 nm affects the stability of the light-shielding paint. The use of a pigment with a number-average particle diameter of more than 200 nm leads to significant internal reflection in the light-shielding film.

The coloring agent content of the light-shielding film 3 according to this embodiment can be 5.0% by mass or more and 30.0% by mass or less, preferably 10.0% by mass or more and 15.0% by mass or less.

The light-shielding film 3 according to this embodiment may optionally contain inorganic fine particles for adjusting its refractive index. Ensuring that the difference in refractive index (nd) between the substrate 2 and the light-shielding film 3 is 0.0 or more and 0.2 or less reduces internal reflection.

The inorganic fine particles may have a refractive index (nd) of 2.2 or more. The number-average particle diameter of the inorganic fine particles can be 5 nm or more and 1000 nm or less, preferably 10 nm or more and 100 nm or less. The use of inorganic fine particles with a number-average particle diameter of less than 5 nm affects the stability of the light-shielding paint, making the paint more viscous and more likely to gel. The use of inorganic fine particles with a number-average particle diameter of more than 1000 nm leads to the advantage of the prevention of white spots in the light-shielding film being insufficient.

The use of inorganic fine particles having a refractive index (nd) of 2.2 or more will give the resulting light-shielding film 3 a high refractive index, therefore helping to reduce internal reflection. Examples of usable inorganic fine particles having a refractive index (nd) of 2.2 or more include fine particles of titanium oxide, zirconium oxide, aluminum oxide, yttrium oxide, cadmium oxide, diamond, strontium titanate, and germanium. In particular, titanium oxide and zirconium oxide have a refractive index (nd) of 2.2 or more and 3.5 or less. When the refractive index of the inorganic fine particles is less than 2.2, the increase in the refractive index of the light-shielding film is accordingly small. The difference in refractive index between the substrate and the light-shielding film is therefore large, so that internal reflection will not be sufficiently reduced.

The number-average particle diameter of the inorganic fine particles having a refractive index (nd) of 2.2 or more can be 10 nm or more and 100 nm or less, preferably 10 nm or more and 20 nm or less. Although the smaller the number-average particle diameter of the inorganic fine particles with a refractive index (nd) of 2.2 or more is the better it would be, it is practically difficult to disperse such particles to a number-average particle diameter of less than 10 nm. The use of inorganic fine particles having a number-average particle diameter of more than 100 nm leads to likely occurrence of light scattering. Note that the number-average particle diameter of the inorganic fine particles is based on the actual size of particles in the light-shielding film. For example, if the inorganic fine particles are in the form of aggregates, their average particle diameter is based on the size of the aggregates.

The amount of the inorganic fine particles in the light-shielding film 3 according to this embodiment can be 5.0% by mass or more and 40.0% by mass or less, preferably 10.0% by mass or more and 15.0% by mass or less. The use of less than 5.0% by mass inorganic fine particles in the light-shielding film 3 leads to the increase in refractive index being so small that internal reflection will be significant. The use of more than 40.0% by mass inorganic fine particles in the light-shielding film 3 affects the adhesion and durability of the film.

The light-shielding film 3 may optionally contain an amine-based hardener as a curing agent for the epoxy resin. Any known amine-based hardener can be used as long as intended characteristics are given. Examples of amine-based hardeners that can be used include linear aliphatic ones, polyamide-based ones, alicyclic ones, and aromatic ones, as well as dicyandiamide, adipic acid dihydrazide, and so forth. Any one of these can be used alone, and it is also possible to use a mixture of two or more of these.

The hardener content of the light-shielding film 3 can be 1.0% by mass or more and 25.0% by mass or less. A hardener content of less than 1.0% by mass causes the degree of hardening of the light-shielding film to be so low that the adhesion of the film to the substrate is affected. A hardener content of more than 25.0% by mass leads to low optical characteristics.

The light-shielding film 3 may optionally contain additives unless its intended purpose is defeated. Examples of additives that can be used include fungicides and oxidation inhibitors. The additive content of the light-shielding film 3 according to this embodiment can be 15.0% by mass or less, preferably 10.0% by mass.

Coating on the Light-Shielding Film

The optical element 1 according to this embodiment has a coating 4 on the light-shielding film 3, the coating 4 including cured mixture of melamine or benzoguanamine resin, and a phenolic resin.

The production of the melamine resin is as in reaction formula (1) below. Melamine, an amino triazine compound, produces a methylol melamine resin, and this methylol melamine resin is crosslinked through heating.

Reaction formula (1)

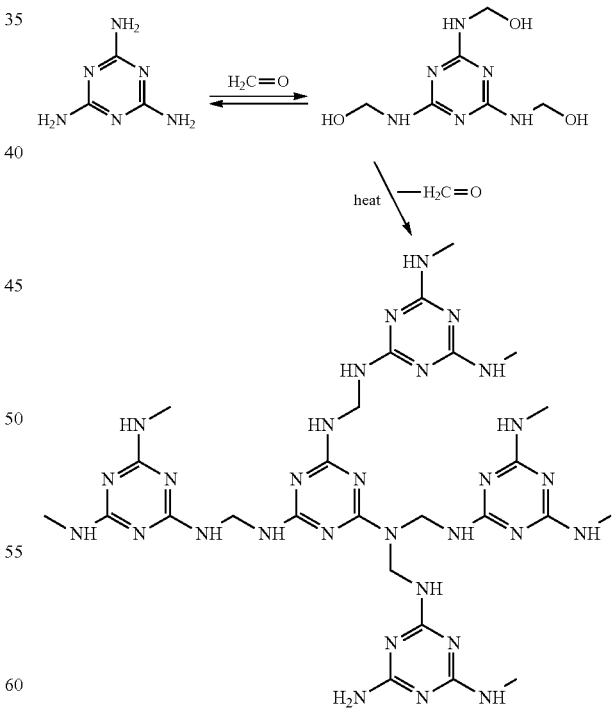

The production of the benzoguanamine resin is as in reaction formula (2) below. Benzoguanamine, an amino triazine compound, produces a methylol benzoguanamine resin, and this methylol benzoguanamine resin is crosslinked through heating.

Reaction formula (2)

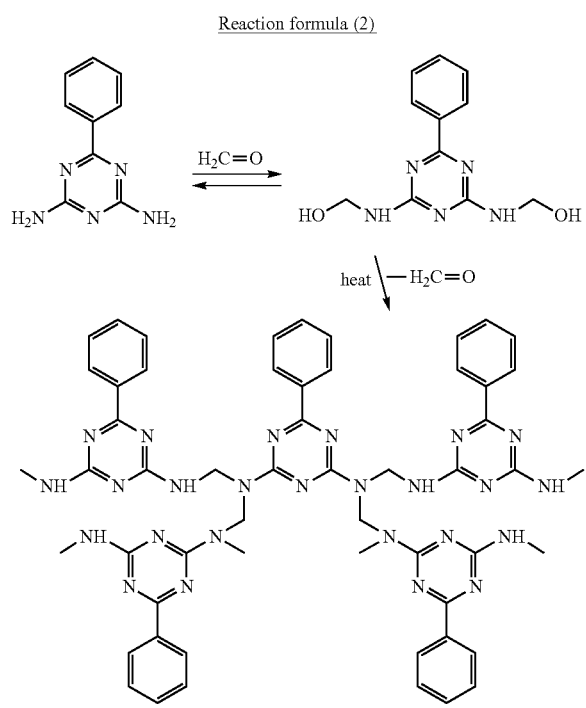

Besides the melamine or benzoguanamine resin and the phenolic resin, the coating 4 on the light-shielding film 3 may optionally contain other materials, such as epoxy resin. The phenolic resin can be any commonly used industrial phenolic resin, preferably a resol resin, a type of thermally curable resins. Resol resins are readily available in liquid form and easy to handle. The phenolic resin may be liquid at the ordinary temperature, and may contain a solvent to adjust its viscosity. Examples of commercially available phenolic resins include Showa Denko SHONOL (registered trademark), Sumitomo Bakelite SUMILITE RESIN (registered trademark), and some phenolic resins available from DIC Corporation.

The presence of a methylol resin in the coating 4 on the light-shielding film makes this protective coating waterproof and resistant to alkalis. As a thermally-activated crosslinking agent, furthermore, the methylol resin is crosslinked when heated in the presence of a hydroxy-bearing resin. This enhances the waterproofness of the coating by increasing the crosslinking density of the coating.

The coating 4 on the light-shielding film, containing hydroxy-bearing resin(s) such as the phenolic resin and epoxy resin, is highly flexible and firmly adheres to the light-shielding film.

The melamine or benzoguanamine resin content of the coating 4 on the light-shielding film can be 5.0% by mass or more and 100% by mass or less, preferably 20.0% by mass or more and 60.0% by mass or less. A melamine or benzoguanamine resin content of less than 5.0% by mass leads to the waterproofness and alkali resistance of the coating being so low that the light-shielding film will be likely to change its shade of color and develop white spots when used for a long period of time under high-temperature and high-humidity conditions. The phenolic resin content of the coating 4 on the light-shielding film can be 0% by mass or more and 95% by mass or less, preferably 40% by mass or more and 80% by mass or less.

The coating 4 on the light-shielding film includes a cured mixture of melamine or benzoguanamine resin, and a phenolic resin. The coating 4 can be a cured mixture of melamine or benzoguanamine resin, and a phenolic resin, in proportions of 1:5 to 7:5 (the melamine or benzoguanamine resin to the phenolic resin). The use of the melamine resin or benzoguanamine resin in any proportion lower than in this ratio leads to the crosslinking density of the resin being so low that the waterproofness of the coating is affected. As a result, a great change in the shade of color and many white spots will be observed in the light-shielding film 3 after a reliability study. The use of the phenolic resin in any proportion lower than in this ratio leads to low adhesion between the coating 4 and the light-shielding film 3. This also results in a great change in the shade of color and many white spots being observed in the light-shielding film 3 after a reliability study. The coating 4 may be a condensation product of the melamine or benzoguanamine resin and the phenolic resin.

Antireflection Film

The optical element 1 according to this embodiment can have an antireflection film 5 on at least part of its optically effective sections 2a and 2b. Examples of materials of which the antireflection film 5 can be made include inorganic materials or oxides such as zinc, aluminum, silicon, and titania, metal fluorides such as magnesium fluoride, and polymers.

The antireflection film 5 may have a textured structure formed by crystals mainly of an aluminum hydroxide or a hydrate of an aluminum oxide on its surface. Such a film has great antireflection capability.

Others

Besides these films and coating, the optical element 1 according to this embodiment may optionally have additional functional films. For example, there may be a hard coating layer that protects the film or coating therebeneath. There may be a single or multiple layers of film between the substrate 2 and the antireflection film 5 and/or the light-shielding film 3. This can lead to enhanced antireflection capability and/or enhanced adhesion to the substrate.

Method for Producing an Optical Element

Formation of a Light-Shielding Film

A method according to an embodiment of the invention for producing an optical element includes forming a light-shielding film 3 on an outer portion of a substrate 2.

The paint used to form the light-shielding film 3 according to this embodiment (hereinafter referred to as "the light-shielding paint") contains at least a coloring agent and a binder resin. The binder resin can be epoxy resin. The light-shielding paint may contain 10.0% by mass or more and 20.0% by mass or less epoxy resin, 25.0% by mass or more and 35.0% by mass or less coloring agent, e.g., a black dye, and 15.0% by mass or more and 25.0% by mass or less excipient, such as filler. Besides these materials, the light-shielding paint contains an organic solvent.

The light-shielding paint may optionally contain a hardener. The hardener can be an amine-based hardener as a curing agent for the epoxy resin. Any known amine-based hardener can be used, examples including linear aliphatic ones, polyamide-based ones, alicyclic ones, and aromatic ones, as well as dicyandiamide, adipic acid dihydrazide, and so forth. Any one of these can be used alone, and it is also possible to use a mixture of two or more of these.

This embodiment may include adjusting the thickness of the light-shielding film and/or the concentration and viscosity of the light-shielding paint in order to make the paint easier to handle. These can be done through the addition of organic solvent or epoxy resin.

The light-shielding paint may contain at least one selected from tar, pitch, dye, pigment, mica particles, and silica particles.

The application of the light-shielding paint can be done using any method deemed appropriate according to the shape of the substrate and the position of the optically ineffective section, examples including brush painting, spin coating, spray coating, and dip coating.

Likewise, the curing of the light-shielding paint can be done through a thermal process, and can also be done using any other process that produces a cured product similar to that by a thermal process. If a thermal process is used, the heating conditions are selected according to the kind of the hardener and the heat resistance of the substrate. For a light-shielding paint that contains a hardener, the heating temperature can be 60° C. or more and 200° C. or less, preferably 80° C. or more and 120° C. or less, and the duration of heating can be 30 minutes or more and 20 hours or less, preferably 1 hour or more and 4 hours or less.

Formation of a Coating on the Surface of the Light-Shielding Film

The method according to this embodiment for producing an optical element includes, after the formation of the light-shielding film, applying a paint that includes a methylol melamine or methylol benzoguanamine resin to the surface of the light-shielding film to form a coating on the light-shielding film.

The paint used to form the coating on the light-shielding film (hereinafter referred to as "the coating paint") includes a methylol melamine or methylol benzoguanamine. The coating paint contains at least a methylol as a reaction product of an amino triazine compound having two or more amino groups and formaldehyde. The methylol can be of any kind, preferably a methylol that contains a triazine ring and a methylol group in its structure, such as a methylol melamine or methylol benzoguanamine.

The methylol can be liquid at the ordinary temperature, and its properties may allow it to be easily cured through heating at low temperatures. Examples of commercially available methylol resins include NIKALAC MX-706 methylol melamine resin (Sanwa Chemical) and NIKALAC BL-60 methylol benzoguanamine resin (Sanwa Chemical).

The application of the paint that includes a methylol melamine or methylol benzoguanamine can be done using any method deemed appropriate according to the shape of the substrate and the position of the optically ineffective section, examples including brush painting, spin coating, spray coating, and dip coating.

The method according to this embodiment for producing an optical element may include, after the application of the paint that includes a methylol melamine or methylol benzoguanamine resin, curing this paint to form a coating on the light-shielding film, more specifically curing the methylol melamine to form a coating that includes a melamine resin or curing the methylol benzoguanamine to form a coating 4 that includes a benzoguanamine resin.

The curing of the paint that includes a methylol melamine or methylol benzoguanamine can be done through a thermal process, and can also be done using any other process that produces a cured product similar to that by a thermal process. If a thermal process is used, the heating conditions are selected according to the kind of the methylol and phenolic resins and the heat resistance of the substrate. For the aforementioned methylol resin-based formulation, the heating temperature can be 100° C. or more and 250° C. or less, preferably 140° C. or more and 220° C. or less.

Formation of an Antireflection Film

The method according to this embodiment for producing an optical element includes, after the formation of the coating through the application of the paint that includes a methylol melamine or methylol benzoguanamine, forming an antireflection film 5 on the substrate 2. Examples of processes through which the antireflection film can be formed include those that involve heating in the air, such as liquid-phase processes, and those performed under humid conditions, such as immersion in warm water.

The formation of the antireflection film involves applying paint for forming the antireflection film (hereinafter referred to as the "antireflection paint") to at least part of the optically effective sections 2a and 2b of the substrate 2 to form the antireflection film 5. Methods such as spin coating, spray coating, and dip coating can be used to apply the antireflection paint. The antireflection paint may be applied unevenly to part of the light-shielding film 3 and coating 4. Examples of ways to form a film with antireflection capability from the antireflection paint include forming a layer with a controlled refractive index or a textured structure on the surface of the substrate.

The layer with a controlled refractive index can be formed through, for example, the application of fine particles of a material having a low refractive index, such as magnesium fluoride, or the application of hollow particles of silicon oxide.

The antireflection film with a textured structure can be formed on the substrate by, for example, applying an aluminum-oxide- or aluminum-containing antireflection paint to the surface of the substrate, fixing the material into a film through heating, and then immersing the film in or bringing it into contact with warm water or exposing the film to steam. For the heating following the application of the paint, the heating temperature can be 100° C. or more and 220° C. or less, and the duration of heating can be 5 minutes or more and 24 hours or less. The temperature of the warm water can be 40° C. or more and 100° C. or less, and the time of contact with the warm water can be 5 minutes or more and 24 hours or less. Through the immersion of the film in or contact with warm water or the exposure of the film to steam, the aluminum component in the film dissolves or separates out through reaction, creating a textured structure formed by crystals mainly of an aluminum oxide, an aluminum hydroxide, or a hydrate of an aluminum oxide on the surface. These crystals are tabular, preferably boehmite crystals. These tabular crystals, the end portions of which provide a fine-textured structure, are positioned at a selected angle from the surface of the substrate so that the fine-textured structure has a large height and a small pitch. This textured structure provides excellent antireflection capability by creating an ascending gradient of refractive index from their interface with air to the substrate.

The method according to this embodiment for producing an optical element may further include washing the substrate 2 with an alkaline solution between the formation of the coating on the surface of the light-shielding film and the formation of the antireflection film.

If the antireflection film is formed on the surface of the substrate using a liquid-phase process, the entire lens may be subjected to a washing process so that the surface of the substrate should be clear of any dirt or foreign substance prior to the formation of the antireflection film. The washing process involves immersing the entire lens for 5 to 10 minutes in a cleaning liquid which is a commercially available alkaline detergent diluted and mixed with water to a concentration of 5% by volume to 10% by volume and having an adjusted pH of 9 to 10. The entire lens is then sonicated in purified water for 10 to 20 minutes and dried with hot air at a temperature of 60° C. for 5 to 10 minutes.

Having a coating that includes a methylol melamine or methylol benzoguanamine thereon, the light-shielding film 3 produced in the method according to this embodiment for producing an optical element maintains good appearance through a long period of use under high-temperature and high-humidity conditions even if having been washed with an alkali.

EXAMPLES

The following describes certain aspects of the invention in detail by providing examples. No aspect of the invention is limited to these examples.

Examples and Comparative Examples below involved the following measurements and evaluations.
Appearance After a Reliability Study Under High-Temperature and High-Humidity Conditions The lenses of Examples and Comparative Examples were subjected to a reliability study under high-temperature and high-humidity conditions, where the lenses were held at a temperature of 60° C. and a humidity of 90% for 1000 hours. After the study, visual evaluation was performed on the appearance of the light-shielding film as viewed from the optically effective section 2a side.

The evaluation of appearance consisted of two components, "the shade of color" and "the number of white spots." The following describes the assessment of "the shade of color" and "the number of white spots."
Shade of Color The interface between the light-shielding film 3 with the coating 4 and the substrate of the lens was photographed from the optically effective section 2a side using a Canon EOS 70D single-lens reflex camera. On ImageJ image processing program, a 15-mm$^2$ area was cut out of the obtained image within an image region corresponding to the light-shielding film 3 and clear of any dirt or debris. The cropped image was binarized, and the binary image was used to determine the value of brightness, which is herein referred to as "the shade of color." The greater (closer to 255) the value is, the worse the shade of color is. The criteria for the evaluation of the shade of color were as follows.
  A: The shade of color is 0 or more and 50 or less.
  B: The shade of color is more than 50 and 80 or less.
  C: The shade of color is more than 80 and 255 or less.
The Number of White Spots The interface between the light-shielding film 3 with the coating 4 and the substrate of the lens was photographed from the optically effective section 2a side using an EOS 70D single-lens reflex camera (Canon). On ImageJ image processing program, a 15-mm$^2$ area was cut out of the obtained image within an image region corresponding to the light-shielding film 3 and clear of any dirt or debris. The cropped image was binarized, and white spots, i.e., pixels with a value of brightness of 128 or more, were counted on the binary image. The criteria for the evaluation of the number of white spots were as follows.
  A: The number of white spots was 0 or more and 50 or less.
  B: The number of white spots was 50 or more and 200 or less.
  C: The number of white spots was more than 200.

Example 1

Figure 2A:
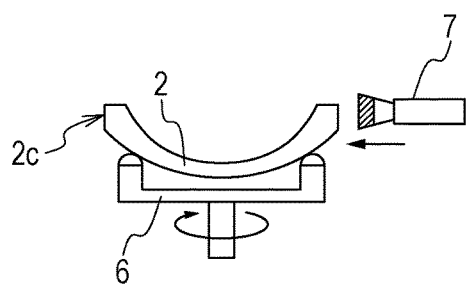
FIGS. 2A to 2E illustrate exemplary methods by which the optical elements of various Examples were produced.

In Example 1, the substrate was a lens made of optical glass (Ohara L-BAL43). Paint for forming the light-shielding film (a light-shielding paint; Canon Chemicals GT-7) was applied to the optically ineffective section of the lens as illustrated in FIG. 2A. With the lens slowly rotated on the turntable 6 in FIG. 2A, the light-shielding paint was applied using a brush 7. The applied paint was dried at room temperature for 2 hours and heated at a temperature of 120° C. for 3 hours to form a light-shielding film 3.

Paint for forming a coating 4 on the surface of the light-shielding film (coating paint) was then prepared as follows. Forty grams of a resol phenolic resin (Showa Denko SHONOL BKM-2620) was dissolved in a solvent mixture of 40 g of 1-methoxy-2-acetoxypropane and 40 g of 1-ethoxy-2-propanol through stirring with a mechanical stirrer at room temperature. The obtained resin solution was mixed and stirred to uniformity with 11.3 g of a methylol resin solution containing an amino triazine compound as raw material for a methylated melamine resin (Sanwa Chemical NIKALAC MX-706 (a solid content of 70.6% by mass)). The obtained solution was used as the coating paint.

Figure 2B:
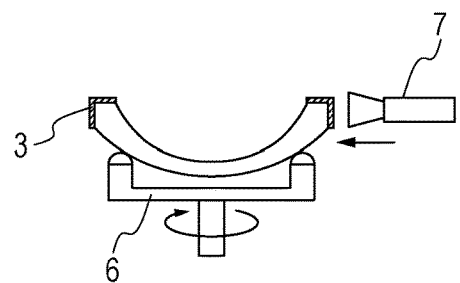

As illustrated in FIG. 2B, the lens with the formed light-shielding film 3 was slowly rotated on the turntable 6 while the coating paint was applied with a brush 7. The application of the coating paint was in such a manner that the entire light-shielding film should be coated. The applied paint was dried at room temperature for 1 hour and heated at a temperature of 150° C. for 3 hours to form a coating 4 on the light-shielding film 3.

The entire lens was then immersed for 5 to 10 minutes in a cleaning liquid which was a commercially available alkaline detergent diluted with water to a concentration of 5% by volume to 10% by volume. The entire lens was then sonicated in purified water for 10 to 20 minutes and dried with hot air at a temperature of 60° C. for 5 to 10 minutes.

Figure 2C:
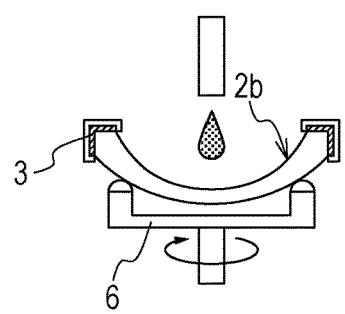
Figure 2D:
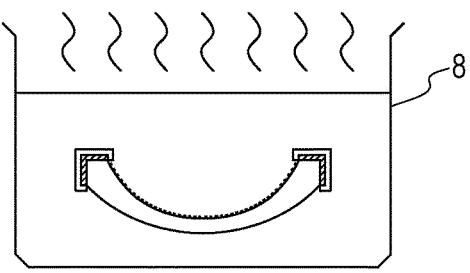
Figure 2E:
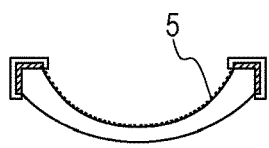

On the turntable 6 in FIG. 2C, the lens having the light-shielding film 3 and the coating 4 on the light-shielding film was spun at 3000 rpm for 30 seconds for spin coating with a drop of an aluminum-oxide- or aluminum-containing paint applied to near the center of the concavity of the optically effective section 2b. Subsequently, the lens was heated at a temperature of 210° C. for 3 hours. The heated lens was immersed in a warm water bath 8 at a controlled temperature of 65° C. or more and 85° C. or less as illustrated in FIG. 2D. This produced the lens illustrated in FIG. 2E, a lens having its optically effective section coated with an antireflection film 5 that had a textured structure formed by crystals mainly of a hydroxide of aluminum or a hydrate of an aluminum oxide.

As presented in the Table, the lens of Example 1 was grade A for both the shade of color and the number of white spots in the appearance evaluation.

Example 2

In Example 2, the coating 4 was formed in the same way as in Example 1 except that the quantity of the coating paint, a methylol resin solution containing an amino triazine compound as raw material for a methylated melamine resin (Sanwa Chemical NIKALAC MX-706 (a solid content of 70.6% by mass)), was 22.6 g. Then the same procedure as in Example 1 was followed, yielding a lens having its optically effective section coated with an antireflection film 5.

As presented in the Table, the lens of Example 2 was grade A for both the shade of color and the number of white spots in the appearance evaluation.

Example 3

In Example 3, the coating 4 was formed in the same way as in Example 1 except that the quantity of the coating paint, a methylol resin solution containing an amino triazine compound as raw material for a methylated melamine resin (Sanwa Chemical NIKALAC MX-706), was 45.3 g. Then the same procedure as in Example 1 was followed, yielding a lens having its optically effective section coated with an antireflection film 5.

As presented in the Table, the lens of Example 3 was grade A for both the shade of color and the number of white spots in the appearance evaluation.

Example 4

In Example 4, the coating 4 was formed in the same way as in Example 1 except that the quantity of the coating paint, a methylol resin solution containing an amino triazine compound as raw material for a methylated melamine resin (Sanwa Chemical NIKALAC MX-706), was 79.4 g. Then the same procedure as in Example 1 was followed, yielding a lens having its optically effective section coated with an antireflection film 5.

As presented in the Table, the lens of Example 4 was grade A for both the shade of color and the number of white spots in the appearance evaluation.

Example 5

In Example 5, the coating paint was prepared as follows. Forty grams of a novolac phenolic resin (Showa Denko SHONOL BRG-557) was dissolved in a solvent mixture of 40 g of 1-methoxy-2-acetoxypropane and 40 g of 1-ethoxy-2-propanol through stirring with a mechanical stirrer at room temperature. The obtained resin solution was mixed and stirred to uniformity with 22.6 g of a methylol resin solution containing an amino triazine compound as raw material for a methylated melamine resin (Sanwa Chemical NIKALAC MX-706 (a solid content of 70.6% by mass)). Except for the use of this solution as the coating paint, the same procedure as in Example 1 was followed to produce a lens.

As presented in the Table, the lens of Example 5 was grade A for both the shade of color and the number of white spots in the appearance evaluation.

Example 6

In Example 6, the coating paint was 22.6 g of a methylol resin solution containing an amino triazine compound as raw material for a methylated benzoguanamine resin (Sanwa Chemical NIKALAC BL-60 (a solid content of 70.6% by mass)). Except for this, the coating 4 was formed in the same way as in Example 1. Then the same procedure as in Example 1 was followed, yielding a lens having its optically effective section coated with an antireflection film 5.

As presented in the Table, the lens of Example 6 was grade A for the shade of color but grade B for the number of white spots in the appearance evaluation.

Example 7

In Example 7, the paint specified below was used to form the light-shielding paint.

The main ingredient of the light-shielding paint was prepared as follows. First, 42.9 g of propylene glycol monomethyl ether, a dispersant, and 14.3 g of fine particles of titania (a refractive index (nd) of 2.2 or more) were dispersed in a bead mill (Kotobuki Industries ULTRA APEX MILL) using 50-μm diameter beads, yielding 57.2 g of slurry containing titania fine particles with a number-average particle diameter of 20 nm. Then 57.2 g of the bead-milled slurry, 21 g of epoxy resin A, 1 g of a coupling agent, 13 g of a coloring agent, and 40 g of propylene glycol monomethyl ether were individually weighed into a ball mill pot. Five 20-mm diameter magnetic balls were then put into the ball mill pot. Titanium oxide (Tayca MT-05) was used as inorganic fine particles having a refractive index (nd) of 2.2 or more. The epoxy resin A was a condensation polymer of 4,4'-isopropylidenediphenol and 1-chloro-2,3-epoxypropane (Mitsubishi Chemical EPIKOTE 828), and the coupling agent was an epoxy silane coupling agent (Shin-Etsu Silicone KBM 403). The formulated paint and magnetic balls in the ball mill pot were stirred on a roll coater for 48 hours. In this way, the main ingredient of the light-shielding paint was obtained.

The coloring agent was a mixture of a black dye, a red dye, two yellow dyes, and a blue dye. The black dye was Orient Chemical Industries VALIFAST BLACK 1821, the red dye was Orient Chemical Industries VALIFAST RED 3320, the yellow dyes were Orient Chemical Industries OIL YELLOW 129 and VALIFAST YELLOW 3108, and the blue dye was Orient Chemical Industries VALIFAST BLUE 1605.

Then 132.2 g of the main ingredient of the light-shielding paint was stirred with 1.9 g of amine-based hardener A and 1 g of a hardening catalyst on a roll coater for 30 minutes. The amine-based hardener A, an aliphatic amine-based hardener, was Adeka Corporation's ADEKA HARDENER EH 6019, and the hardening catalyst A was 2,4,6-tris(diaminomethyl)phenol. Except for the use of this paint as the light-shielding paint, the same procedure as in Example 1 was followed to produce a lens.

As presented in the Table, the lens of Example 7 was grade A for both the shade of color and the number of white spots in the appearance evaluation.

Comparative Example 1

In Comparative Example 1, the same procedure as in Example 1 was followed to produce a lens, but after the formation of the light-shielding film 3 in the same way as in Example 1, no coating was formed on the surface of the light-shielding film.

As presented in the Table, the lens of Comparative Example 1 was grade C for both the shade of color and the number of white spots in the appearance evaluation.

Comparative Example 2

In Comparative Example 2, the coating paint was prepared as follows. Forty grams of a resol phenolic resin (Showa Denko SHONOL BKM-2620) was dissolved in a solvent mixture of 40 g of 1-methoxy-2-acetoxypropane and 40 g of 1-ethoxy-2-propanol through stirring with a mechanical stirrer at room temperature, and the resulting solution was directly used as the coating paint. Except for the use of this solution as the coating paint, the same procedure as in Example 1 was followed to produce a lens.

As presented in the Table, the lens of Comparative Example 2 was grade B for the shade of color and grade C for the number of white spots in the appearance evaluation.

Comparative Example 3

In Comparative Example 3, the coating paint was prepared through the dissolution of 22.6 g of a methylol resin solution containing an amino triazine compound as raw material for a methylated melamine resin (Sanwa Chemical NIKALAC MX-706) in a solvent mixture of 40 g of 1-methoxy-2-acetoxypropane and 40 g of 1-ethoxy-2-propanol through stirring with a mechanical stirrer at room temperature. Except for the use of this solution as the coating paint, the same procedure as in Example 1 was followed to produce a lens.

As presented in the Table, the lens of Comparative Example 3 was grade B for the shade of color and grade C for the number of white spots in the appearance evaluation.

such as a lens, and also as an optical system or optical equipment incorporating such an optical element.

Advantages

An aspect of the invention provides an optical element that has a coating including a melamine or benzoguanamine resin on a nontransparent film. This coating improves the waterproofness and alkali resistance of the nontransparent film, allowing the optical element to maintain good appearance even through a long period of use under high-temperature and high-humidity conditions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-240621 filed Nov. 27, 2014, which is hereby incorporated by reference herein in its entirety.

TABLE

| | Light-shielding film | Coating on the light-shielding film | | | | | | |
|---|---|---|---|---|---|---|---|---|
| | | Methylol resin | | Additional resin | | Melamine or benzoguanamine resin to phenolic resin ratio (by mass) | Appearance after a reliability study | |
| | Main ingredient | Material | Mass [g] | Material | Mass [g] | | Shade of color | The number of white spots |
| Example 1 | GT-7 | Methylol melamine resin | 11.3 | Resol resin | 40 | 1:5 | A | A |
| Example 2 | GT-7 | Methylol melamine resin | 22.6 | Resol resin | 40 | 2:5 | A | A |
| Example 3 | GT-7 | Methylol melamine resin | 45.3 | Resol resin | 40 | 4:5 | A | A |
| Example 4 | GT-7 | Methylol melamine resin | 79.4 | Resol resin | 40 | 7:5 | A | A |
| Example 5 | GT-7 | Methylol melamine resin | 22.6 | Novolac resin | 40 | 2:5 | A | A |
| Example 6 | GT-7 | Methylol benzoguanamine resin | 22.6 | Resol resin | 40 | 2:5 | A | B |
| Example 7 | Dyes | Methylol melamine resin | 22.6 | Resol resin | 40 | 2:5 | A | A |
| Comparative Example 1 | GT-7 | None | — | None | — | — | C | C |
| Comparative Example 2 | GT-7 | None | — | Resol resin | 40 | — | B | C |
| Comparative Example 3 | GT-7 | Methylol melamine resin | 22.6 | None | — | — | B | C |

Overall Review

Examples 1 to 7 demonstrated that if an optical element has a coating including a cured mixture of melamine or benzoguanamine resin, and a phenolic resin, on its light-shielding film, the light-shielding film experiences little change in its shade of color and develops few white spots during a reliability study.

Optical elements according to an aspect of the invention, having their optically ineffective section shielded by a film nontransparent to the spectrum of wavelengths to be used with them and partially or completely protected by a coating suitable for the prevention of damage to the appearance of the nontransparent film, can be used as an optical element

What is claimed is:

1. An optical element comprising:
   a substrate;
   a light-shielding film on part of an outer portion of the substrate; and
   a coating on the light-shielding film,
   wherein the light-shielding film contains a coloring agent, an epoxy resin, and inorganic fine particles having a refractive index of 2.2 or more, and
   wherein the coating contains a cured mixture of melamine or benzoguanamine resin, and a phenolic resin, in proportions by mass of 1:5 to 7:5, a content of the melamine or benzoguanamine resin is 20.0% by mass or more and 60.0% by mass or less when the coating is 100% by mass.

2. The optical element according to claim 1, wherein the coating contains a condensation product of the melamine resin and the phenolic resin.

3. The optical element according to claim 1, wherein the coating contains a condensation product of the benzoguanamine resin and the phenolic resin.

4. The optical element according to claim 1, wherein the substrate is a piece of glass.

5. The optical element according to claim 1, wherein the optical element is a lens or a prism.

6. The optical element according to claim 5, wherein:
the substrate has an optically effective section and an optically ineffective section; and
there is an antireflection film on at least part of the optically effective section.

7. The optical element according to claim 6, wherein the antireflection film is a film formed through a liquid-phase process.

8. The optical element according to claim 6, wherein the antireflection film has a textured structure formed by crystals mainly of an aluminum hydroxide or a hydrate of an aluminum oxide on a surface thereof.

9. An optical equipment comprising:
a lens including the optical element according to claim 1;
a prism including the optical element according to claim 1;
a reflector including the optical element according to claim 1; or
a diffraction grating including the optical element according to claim 1.

10. A camera comprising a lens including the optical element according to claim 1.

* * * * *